United States Patent
Prathipati et al.

(10) Patent No.: US 12,554,828 B2
(45) Date of Patent: Feb. 17, 2026

(54) MULTI-FACTOR AUTHENTICATION USING BLOCKCHAIN

(71) Applicant: Capital One Services, LLC, McLean, VA (US)

(72) Inventors: Jayanth Prathipati, Aldie, VA (US); Daniel Pick, Falls Church, VA (US); Colin Hart, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 676 days.

(21) Appl. No.: 18/050,952

(22) Filed: Oct. 28, 2022

(65) Prior Publication Data

US 2024/0143730 A1 May 2, 2024

(51) Int. Cl.
*G06F 21/44* (2013.01)
*H04L 9/00* (2022.01)
*H04L 9/32* (2006.01)

(52) U.S. Cl.
CPC .......... *G06F 21/445* (2013.01); *H04L 9/3213* (2013.01); *H04L 9/50* (2022.05)

(58) Field of Classification Search
CPC ........ G06F 21/445; H04L 9/50; H04L 9/3213
See application file for complete search history.

(56) References Cited

U.S. PATENT DOCUMENTS

| | | | | |
|---|---|---|---|---|
| 11,963,006 | B2* | 4/2024 | Avetisov | H04L 63/20 |
| 2016/0164884 | A1* | 6/2016 | Sriram | H04L 9/3247 |
| | | | | 705/51 |
| 2017/0053277 | A1* | 2/2017 | Dutt | G06Q 20/363 |
| 2018/0137512 | A1* | 5/2018 | Georgiadis | H04L 63/08 |
| 2020/0053081 | A1* | 2/2020 | Park | H04L 63/0876 |
| 2021/0136068 | A1* | 5/2021 | Smeets | H04L 63/10 |
| 2022/0286287 | A1* | 9/2022 | Wang | H04L 9/0827 |
| 2023/0177171 | A1* | 6/2023 | Kushtagi | G06F 21/602 |
| | | | | 713/155 |
| 2023/0344641 | A1* | 10/2023 | Heart | H04L 9/0894 |
| 2024/0020683 | A1* | 1/2024 | Bacon | H04L 9/50 |
| 2024/0104173 | A1* | 3/2024 | Tiseanu | G06F 21/31 |

* cited by examiner

*Primary Examiner* — Kambiz Zand
*Assistant Examiner* — Afaq Ali
(74) *Attorney, Agent, or Firm* — Foley & Lardner LLP

(57) ABSTRACT

Methods and systems are described herein for novel uses and/or improvements in application or service authentication for a provider of disparate applications and/or services using blockchain technology. As one example, a method and a system are described herein for a unified user device authentication mechanism across multiple lines of service using cryptographic tokens. The system may receive, as part of a login request from a user, an address associated with a cryptography-based storage application, a cryptographic signature, and an identifier associated with a cryptographic token. The system may verify that the cryptographic token is valid and that the cryptography-based storage application controls the cryptographic token to grant the user access to the application or line of service.

18 Claims, 6 Drawing Sheets

MULTI-FACTOR AUTHENTICATION USING BLOCKCHAIN

BACKGROUND

Users of applications or services frequently need to access their accounts, but such accounts need to provide a guarantee of security against unauthorized access. Consequently, a number of authentication mechanisms, including password logins, single sign-on, and one-time passcodes are used by service providers to verify the validity of a login attempt. Users of multiple applications or services often keep track of a myriad of authentication mechanisms for all their disparate accounts, even if the accounts are for different services at the same provider. The lack of shared trust between authentication mechanisms creates an informational burden on the user. Furthermore, each application or service, even if provided by the same provider, keeps track of its own login credentials and maintains a separate login mechanism. Currently, single sign-on providers exist that enable maintaining a single sign-on for different systems. However, these systems have underlying issues. There is still a single set of credentials used for many of these systems, thus the applications and services that use those systems must trust that username password combinations are secure. In addition, every time a new application or service needs to connect to a single sign-on system, there is an extensive configuration needed to enable the new application or service.

SUMMARY

Accordingly, methods and systems are described herein for improving multi-application or multi-service authentication using blockchain technology. In particular, disclosed herein is a unified user device authentication mechanism that may be used across multiple services. This unified user device authentication mechanism may use cryptographic tokens (e.g., non-fungible tokens) in performing user authentication. For example, an authentication system may use a cryptographic token to authenticate login requests to an application or a service. With the login request, the authentication system may receive from a user's device information related to a cryptographic token. The authentication system may use that information to determine that a user's device controls the cryptographic token using a cryptography-based storage application (e.g., an application storing a private key that may be used to sign blockchain operations). Furthermore, the authentication system may verify that the cryptographic token has a trusted creation address and has not been revoked. Once the verification is complete the authentication system may grant access in response to a login request.

In some embodiments, the authentication system may receive, from a user device, a login request, including (1) an address associated with a cryptography-based storage application of a user, (2) a cryptographic signature generated using a private key of the cryptography-based storage application, and (3) a token identifier of a cryptographic token. The login request may be to access an application or a service. For example, a user may wish to log into a first online video game among many online video games designed by a certain gaming studio. The address associated with the cryptography-based storage application may enable the authentication system to determine that the cryptography-based storage application controls the cryptographic token. The cryptographic signature may enable the authentication system to determine that the user is in control of the cryptography-based storage application, and the token identifier may enable the authentication system to retrieve records associated with the cryptographic token.

When the login request is received, the authentication system may determine whether the token is trusted to be used for authentication. In particular, the authentication system may determine, using the token identifier, that the cryptographic token is valid. For example, when a user is logging into a server associated with an online video game, the token identifier included in the login request may have been created by a different system (e.g., a server running a different video game). Thus, the authentication system may determine whether to trust the creator of the cryptographic token. That is, the cryptographic token may include an owner identifier of the cryptography-based storage application associated with a trusted server. Based on determining that the system that created the cryptographic token (e.g., based on an address of the creator's cryptography-based storage application), the authentication system may determine that the cryptographic token is valid for authentication.

The authentication system may also determine that the requesting user controls the cryptography-based storage application associated with the address in the request. Thus, the authentication system may determine, using the cryptographic signature, that the cryptography-based storage application controls the cryptographic token. For example, the authentication system may validate the cryptographic signature provided within the request.

When both the cryptographic token and the user are validated by the authentication system, the authentication system may grant access to the requesting device. In particular, based on determining that both the cryptography-based storage application controls the cryptographic token and that the cryptographic token is valid, the authentication system may grant access to the user responsive to the login request. For example, the authentication system may grant access to the user to play the online video game from the device of the user from which the request has originated.

Before the cryptographic token is used for authentication, the cryptographic token may be generated. The authentication system may generate the cryptographic token when the authentication system receives an original login request. To continue with the example above, the original login request may be for a different video game created by the same gaming studio. The authentication system may receive from a user device an original login request including a cryptographic address and authentication information. A cryptographic address may be an alphanumeric string identifying a cryptography-based storage application which may be hosted on the user device. Authentication information may be login credentials for a traditional mechanism (e.g., username and password). For example, the user may login into the video game from a mobile phone using an account name and password. The user may also send a cryptographic address in an original login request.

The authentication system may, based on a successful login using authentication information, mint a cryptographic token (e.g., commit a blockchain operation generating the token to a blockchain) and authorize the user to authenticate using the cryptographic token. After verifying the authentication information, the system may generate a cryptographic token (e.g., a non-fungible token) to be controlled by the cryptography-based storage application associated with a received address. The cryptographic token may include a user identifier and a creator address. For example, the authentication system may generate a cryptographic token that identifies a creator address for a server hosting the video game to which the original login request was directed. Because the server associated with the video game is known to be maintained by the same gaming studio, the creator address may be trusted by the other video games when authenticating users using the cryptographic token. Thus, the cryptographic token will be trusted by other servers hosting the other video game. The system may then commit the cryptographic token to the blockchain such that the cryptography-based storage application controls the cryptographic token. By doing so, the system grants the user the ability to authenticate using the cryptographic token in future login requests.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
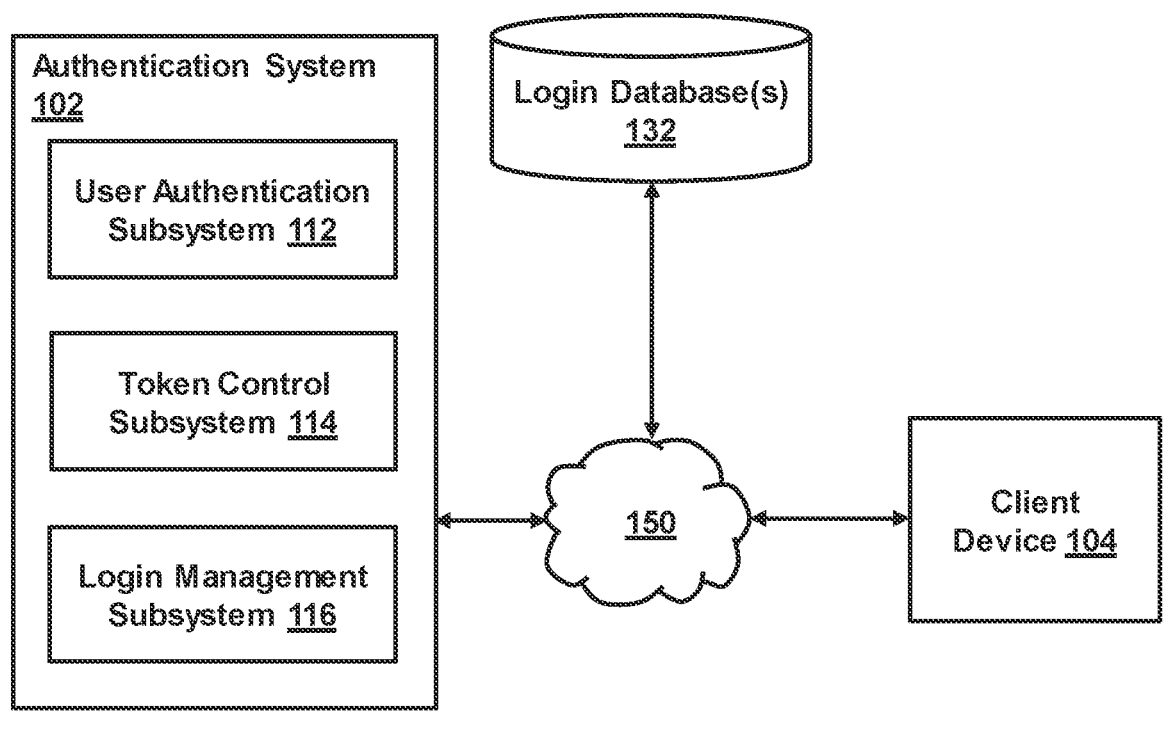
FIG. 1 shows an illustrative diagram for enabling authentication from multiple applications or services using cryptographic tokens, in accordance with one or more embodiments.

FIG. 1 shows environment 100 for enabling authentication from multiple applications or services using cryptographic tokens. Environment 100 may include authentication system 102, login database 132, client device 104, and network 150. Environment 100 may include other components. For example, environment 100 may include multiple client devices, multiple login databases, etc. Authentication system 102 may reside on a physical computing device or a virtual computing device and may include hardware components, software components, or both. Login database 132 may also reside on a physical server or a virtual server. Although, login database 132 is shown separately from authentication system 102, login database 132 may reside on the same computing device as authentication system 102. Authentication system 102 may include user authentication subsystem 112, token control subsystem 114, and login management subsystem 116. Each of those subsystems may include hardware components, software components, or both. Client device 104 may be any suitable computing device that a user may interact with. For example, client device 104 may be a smartphone, electronic tablet, or a computer.

Authentication system 102 may receive a login request from, for example, client device 104. The login request may include (1) an address associated with a cryptography-based storage application of a user, (2) a cryptographic signature generated using a private key of the cryptography-based storage application, and (3) a token identifier of a cryptographic token.

Figure 2:
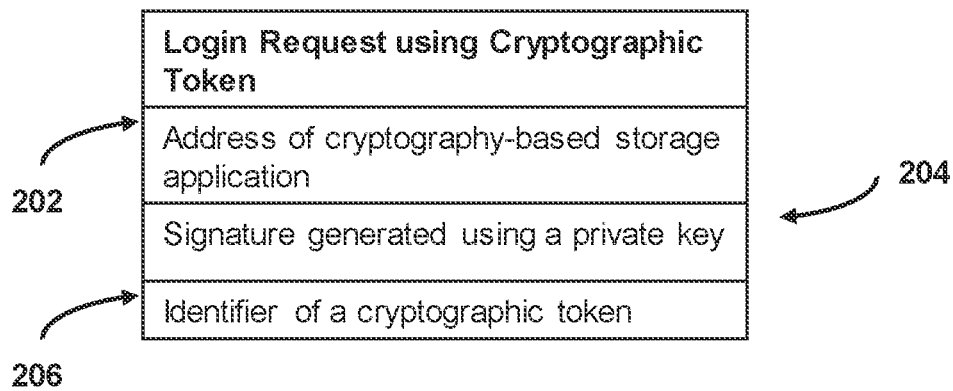
FIG. 2 shows the data structure of a login request, in accordance with one or more embodiments.
Figure 2:
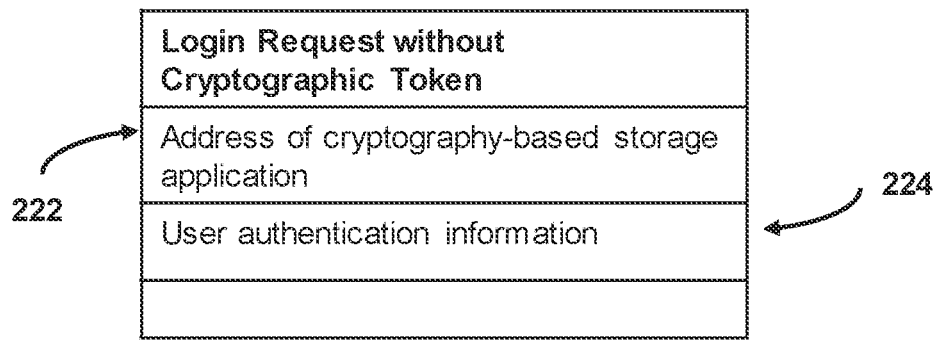

FIG. 2 illustrates exemplary data structure 200 for a login request using a cryptographic token. Data structure 200 may include component 202, the address of a cryptography-based storage application, component 204, a cryptographic signature generated using a private key, and component 206, the token identifier of a cryptographic token. For example, this login request may be from a second application on the user device distinct from a first application a login request to which caused the generation of the cryptographic token. For example, the first application may be a first video game created by a video game studio and the second application may be a second game created by the same video game studio. In some examples, component 202 may be a string of alphanumeric characters that identify a cryptography-based storage application under the user's control. For example, the address of the cryptography-based storage application may be a string of 32 alphanumeric characters and may identify what is sometimes referred to as a cryptographic wallet. That is, a cryptography-based storage application may be a cryptographic wallet. A cryptographic wallet may be assigned to control cryptographic assets and may be capable of sending messages including a cryptographic signature using one or more encryption algorithms. A cryptographic wallet of the user may be a software application on a user device, or it may be a hardware device paired with software. Some examples of hardware cryptographic wallets include Ledger® and Trezor®. Software cryptographic wallets may include MetaMask® and others. Component 202 may be used to indicate the address under which control the cryptographic token should be found.

Component 204 may be a cryptographic signature generated using a private key of the cryptographic wallet. For example, a blockchain node that participates in the blockchain network may use the cryptographic signature of component 204 to authenticate that the login request is from the controller of the cryptography-based storage application. In some examples, component 204 may be a cryptographic signature. A cryptographic signature may be generated using a private key of a cryptography-based storage application in a user's control. The cryptographic signature may be verified by a blockchain node in the blockchain using the public key of the same cryptography-based storage application corresponding to the user. As referenced herein, blockchain operation functionality may include any functionality specific to a blockchain, such as functionality for performing blockchain transactions (e.g., generating cryptographic tokens, transferring those tokens, etc.).

For example, a function (e.g., Rivest-Shamir-Adleman (RSA) function) may be applied to a message (or the hash of a message) with the private key of the cryptography-based storage application belonging to the sender. A node of the blockchain may verify that the request is coming from the cryptography-based storage application by applying a function with the public key to the digital signature and comparing the result to the expected message (or the hash of the message). If the expected message and/or hash matches the result of applying the function, then the authentication system can verify that the request is coming from the cryptography-based storage application associated with the private and public keys. Thus, the authentication system may ensure the cryptographic signature comes from the user that controls the cryptography-based storage application. Proof that the user controls the private key of the cryptographic address is proof that the cryptographic token has been assigned to authenticate the user. Any suitable functions and/or alternative digital signature schemes may be used, such as Probabilistic Signature Scheme (PSS) and/or the like.

Component 206 is the token identifier of the cryptographic token. It may be a string of alphanumeric characters that point to a cryptographic token committed to the blockchain. The token identifier allows the system to locate the cryptographic token and to verify that the cryptographic token has not been revoked. The authentication system may find a cryptographic token with a data structure described in FIG. 3, and use its creator address and uniform resource identifier to verify that the cryptographic token is valid. The authentication system may reference a login database and search for all login requests in association with the cryptographic token's uniform resource identifier and search for instances where trust in the cryptographic token has been revoked. Should there be such an instance, the system may deny the subsequent login request. Otherwise, if the creator address of this cryptographic token is on a list of trusted generation addresses, and the owner identifier of the cryptographic token indicates that the user's cryptography-based storage application controls the cryptographic token, the cryptographic token may be validated.

Coming back to FIG. 1, the login request may be handled by login management subsystem 116. Login management subsystem 116 may include software components, hardware components, or a combination of both. Login management subsystem 116 may parse the login request and extract the data mentioned above. As referred to herein a cryptography-based storage application refers to an application that stores a key for encrypting data. In some embodiments, a cryptography-based storage application may be stored on a computing device belonging to a user (e.g., client device 104) and may store a private key associated with that user. The private key may be used to sign any operations (e.g., blockchain operations) to show that the user controls a particular cryptographic token assigned to an address associated with the cryptography-based storage application. The address may be any identifier that identifies a particular cryptography-based storage application. An address (sometimes referred to as an identifier) of a particular cryptography-based storage application may be inserted into a cryptographic token to indicate that the cryptographic token is controlled by the cryptography-based storage application associated with the address. The cryptographic signature may be a signature that proves that the client device requesting authentication controls the cryptography-based storage application associated with the address. The token identifier of the cryptographic token may indicate to authentication system 102 the basis for the login.

For example, authentication system 102 may receive a request to access a service from client device 104. The service may be a first video game application that may be initiated from client device 104. Login management subsystem 116 may extract, from the login request, the token identifier associated with the cryptographic token. In some embodiments, login management subsystem 116 may retrieve metadata from the cryptographic token. The metadata may include the cryptographic token's generation address, its uniform resource identifier, and its owner address. The generation address may correspond to a cryptography-based storage application that caused the cryptographic token to be generated (e.g., committed to the blockchain). The uniform resource identifier may be a link to a location (e.g., to a server hosting login database 132) where authentication system 102 may maintain a login record of the user. Furthermore, the owner address (e.g., identifier) may be an address of a cryptography-based storage application that controls (e.g., owns) the cryptographic token. Login management subsystem 116 may log the address of the cryptography-based storage application, the signature, and the token identifier of the cryptographic token so that a full record of user logins may be maintained. The log may be hosted by login database 132.

When the login request is received, authentication system 102 may determine that the cryptographic token is valid. Authentication system 102 may perform this operation using the metadata that login management subsystem 116 has collected in relation to the login request. For example, authentication system 102 may determine a generation address attached to the cryptographic token. For example, if the cryptographic token was generated when the user logged into a second video game application on their user device, the generation address may display as a string symbolizing the second video game application or pointing to a server hosting the second video game application. The system may compare the generation address of the cryptographic token against a list of trusted generation addresses. For example, the system may find a list of trusted addresses for the first video game application, including various software by the game's developer. The system may determine that the second video game application is on this list of trusted addresses, and hence decide the cryptographic token is valid, barring invalidation through login records. The system may examine a login log associated with the cryptographic token. This login log may be hosted in login database(s) 132 in some embodiments. For example, the system may retrieve a uniform resource identifier for the cryptographic token and use the uniform resource identifier to find login records in login database(s) 132. If the login records contain user logins which are all valid, authentication system 102 may determine that the cryptographic token has not been revoked. If the records indicate that the cryptographic token has not been revoked, the cryptographic token is validated.

Authentication system 102 may determine, using the cryptographic signature, that the cryptography-based storage application controls the cryptographic token. The system may review the validity of the cryptographic signature via a blockchain operation. Authentication system 102 may decrypt the cryptographic signature (e.g., using an algorithm corresponding to the private key of the cryptography-based storage application) to ensure that the private key of the cryptographic address of the cryptography-based storage application was used to generate the signature, and hence determine that the user is in control of the cryptography-based storage application. In addition, the system may reference the owner address among the metadata retrieved by login management subsystem 116. Upon the owner address matching the cryptographic address of the cryptography-based storage application, the authentication system may determine that the cryptography-based storage application controls the cryptographic token. The address of the cryptography-based storage application may match the owner address when the alphanumeric string representing the address of the cryptography-based storage application is identical to the owner address stored as metadata with the cryptographic token.

If the authentication system determines that the cryptography-based storage application controls the cryptographic token and that the cryptographic token is valid, the user may be successfully logged in to the application or service. However, if authentication system 102 determines that the user device associated with the cryptography-based storage application has been compromised, it may deny the subsequent login request and revoke the cryptographic token. For example, the system may detect that a user device which had been able to authenticate for a video game application using a cryptographic token controlled by a cryptography-based storage application on the user device has been hacked. The system may therefore have reason to revoke the use of the cryptographic token by the user device. To do so, the system may retrieve a uniform resource identifier associated with the cryptographic token and transmit a revocation request for the cryptographic token to a computing device associated with the cryptography-based storage application. In some embodiments, the system may use the uniform resource identifier as a link to a computing device capable of modifying the owner address of the cryptographic token, and transmit a request to the computational device to modify the owner address of the cryptographic token to be null or unavailable. The system may make an entry in login database(s) 132 that the cryptographic token has been revoked, and/or that the user identifier corresponding to the user device has been compromised. By doing so, the system may deny access dependably and efficiently to devices and users who are no longer trustworthy.

Authentication system 102 may generate a cryptographic token (e.g., a non-fungible token) for a user when they successfully authenticate with an original login request—without the use of a cryptographic token.

FIG. 2 shows an illustrative data structure 220 for a login request without a cryptographic token. Data structure 220 exemplifies a login request without using a cryptographic token, which may include component 222, an address associated with a cryptography-based storage application of a user, and component 224, the user's authentication information. Component 222 may identify a cryptography-based storage application in the user's control where the cryptographic token may be assigned to establish the user's connection with the cryptographic token. It may be similar to component 202, including a string of 32 alphanumeric characters like described above. A cryptographic token similar to the one in component 222 may be generated in association with an original login request, and subsequent login requests using the cryptographic token may identify the same cryptography-based storage application as component 202. Component 224 may be credentials for a conventional login mechanism through which a user may access the application or line of service for which the user sent login requests. For example, component 224 may be the combination of an account number, a routing number, and a password for a banking application. In other embodiments, component 224 may be a multifactor authentication factor set like one-time passcodes in combination with account identifiers. Component 224 may be used to authenticate a user (e.g., using a username and password). Based on a successful login, the authentication system may generate a cryptographic token to be used for later logins from this and other systems.

Authentication system 102 may receive, from a user device, an original login request, including (1) the address associated with the cryptography-based storage application of the user and (2) authentication information for authenticating the user. The authentication information may be a conventional login credential set, like a username and a password, or a one-time code. The address received as part of the original login request may point to a cryptography-based storage application controlled by the user, which is capable of performing blockchain operations such as sending cryptographic signatures and messages. The cryptographic token will be created to be controlled by the cryptography-based storage application associated with the address. Creation of the cryptographic token is described further in this disclosure.

User authentication subsystem 112 may authenticate the user using the authentication information the user submitted. User authentication subsystem 112 may include software components, hardware components, or a combination of both. In an original login request, user authentication subsystem 112 may send the user's authentication information to a conventional authentication system ordinarily used by an application or a service to authenticate users. For example, if a video game application uses a username and password for logging users in, user authentication subsystem 112 may access the existing password verification mechanisms to authenticate a login request. In another example, a one-time passcode sent to the user's device at the time of the login request may verify their identity. When user authentication subsystem 112 successfully authenticates an original login request, user authentication subsystem 112 may instruct token control subsystem 114 to generate a cryptographic token.

Figure 3:
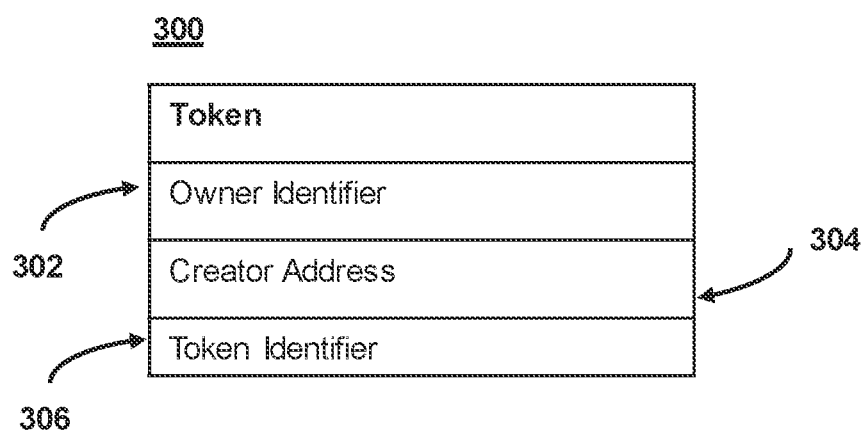
FIG. 3 shows an example of data stored within a cryptographic token, in accordance with one or more embodiments.

Authentication system 102 may generate a cryptographic token upon authenticating the user, for example, using token control subsystem 114. FIG. 3 illustrates a data structure 300 representing a cryptographic token generated by authentication system 102. Data structure 300 may include owner identifier 302, creator address 304, and token identifier 306. Token identifier 306 may be an identifier for the cryptographic token. Token identifier 306 may have a value such as an unsigned integer value from 8 bits to 256 bits. In some embodiments, the term creator address refers to an address associated with the application or line of service for which the original login request that generated the cryptographic token was sent.

When user authentication subsystem 112 successfully authenticates an original login request, token control subsystem 114 may generate a cryptographic token. The cryptographic token may be committed to a blockchain with indication that a cryptography-based storage application contained in the original login request is to control the cryptographic token. For example, the authentication system may add to the owner identifier of the cryptographic token the cryptographic address of the cryptography-based storage application. Owner identifier 302 may thus include an alphanumeric string that proves the cryptography-based storage application controls the cryptographic token. The cryptography-based storage application may be controlled by a user.

As part of the generation process, an on-chain program may insert metadata into the cryptographic token when executed. For example, the application address of the application to which the original login request was directed may be inserted into the cryptographic token as a creator address (component 304). The cryptographic token may also include a uniform resource identifier. This uniform resource identifier may be an alphanumeric string, which may identify data associated with the cryptographic token within a login database such that the authentication system may determine that the cryptographic token has not been revoked. The on-chain program may commit the cryptographic token (e.g., mint the cryptographic token) to the blockchain via a blockchain operation. The generated cryptographic token may be generated to be controlled by an address associated with the cryptography-based storage application (e.g., a cryptography-based storage application associated with a user or entity that should have access to authentication using the cryptographic token).

Token control subsystem 114 may include software components, hardware components, or a combination of both. For example, token control subsystem 114 may include software components (e.g., API calls) that access and/or execute programs such as on-chain programs to generate tokens (e.g., cryptographic tokens). Token control subsystem 114 may generate cryptographic tokens, commit them to the blockchain, infuse them with metadata, and assist with authenticating users' subsequent login requests.

Token control subsystem 114 may generate a cryptographic token by communicating with the blockchain to commit a cryptographic token to the blockchain. The blockchain operation may generate a token to be controlled by a cryptography-based storage application indicated in the original login request. Token control subsystem 114 may do so by accessing the data field of owner address within the cryptographic token and writing to the data field the address of the cryptography-based storage application. Token control subsystem 114 may also, at the time of creating the cryptographic token, insert the application address of the application to which the original login request was directed into the cryptographic token as a creator address. In the video game application login example, token control subsystem 114 may record, in the cryptographic token, that the creator address of the cryptographic token is the first video game application. Token control subsystem 114 may do so by accessing the data field of creator address within the cryptographic token and writing to the data field the address of the video game application. By doing so, other components of the system may later identify the address as a trusted generation address. For example, were the user to log into a different video game application of the same developer, the authentication system may recognize that the cryptographic token has a trusted creation address and hence validate the cryptographic token. Token control subsystem 114 may, at this time, instruct login database(s) 132 to record the original login request in association with the cryptographic token.

Login database(s) 132 may record each login request associated with a cryptographic token, for each cryptographic token. At the time the cryptographic token is created, login database 132 may record a creator address associated with the cryptographic token, a uniform resource identifier associated with the cryptographic token, user information associated with the cryptographic token, and the address of the cryptography-based storage application associated with the cryptographic token. For each subsequent login request, the application to which the login request is directed may also be recorded in association with the cryptographic token. Login database(s) 132 may provide proof that the cryptographic token is in good standing and trustworthy for authenticating the user.

When the cryptographic token is created, metadata may be infused into the cryptographic token and/or recorded in login database(s) 132. Authentication system 102 may retrieve an application identifier associated with the application to which the original login request was directed. For example, the application identifier may point to one of many video games by a gaming studio. Authentication system 102 may determine, based on the application identifier, that the application is an authorized authenticator. Authentication system 102 may refer to a predetermined list of authorized authenticators to trust the application identifier. The authentication system may retrieve an application address corresponding to an original cryptography-based storage application associated with the application. Authentication system 102 may insert the application address into the cryptographic token as the creator address. Authentication system 102 may sign the blockchain operation request which commits the cryptographic token to the blockchain with an original private key corresponding to the original cryptography-based storage application associated with the application. By doing so, the system may ensure the cryptographic token was created in a valid manner with a trusted creator address.

Authentication system 102 may transmit, to a computing device associated with the uniform resource identifier, a first insertion request to insert first metadata associated with the original login request into a login log (e.g., login database(s) 132) associated with the cryptographic token. The first metadata may include the authentication information the user submitted for the original login request, the address of the cryptography-based storage application, all the contents of the cryptographic token as described in FIG. 3, and a uniform resource identifier of the cryptographic token, among other possibly relevant data. The first insertion request is signed using a first private key corresponding to a first cryptography-based storage application of a first application to which the user logged in. The cryptographic signature may be necessary to ensure the validity of the metadata.

Figure 4:
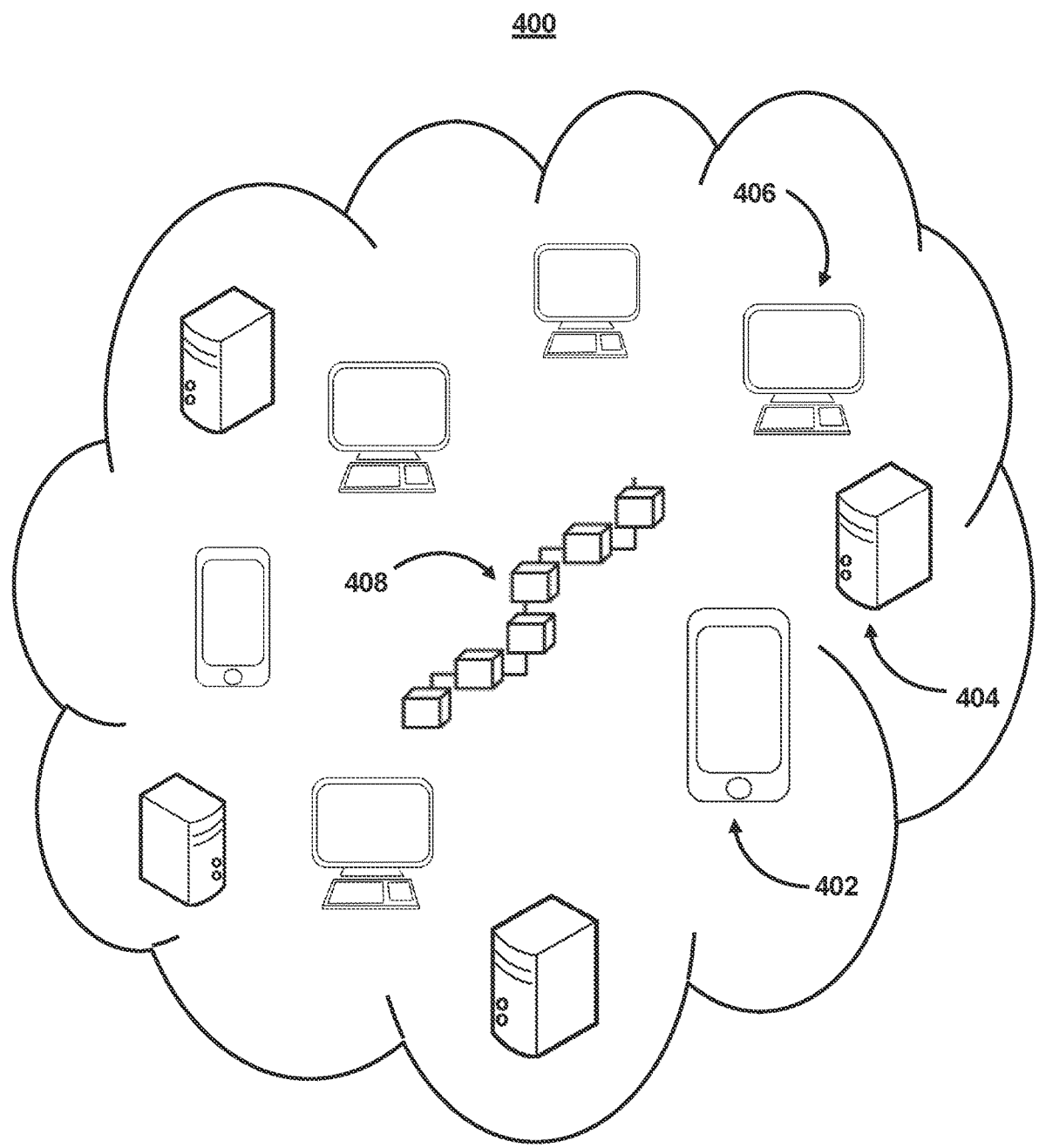
FIG. 4 shows an illustrative diagram for conducting blockchain operations, in accordance with one or more embodiments.

FIG. 4 shows an illustrative diagram for a decentralized environment for performing blockchain functions, in accordance with one or more embodiments. For example, the diagram presents various components that may be used to commit cryptographic tokens to the blockchain in some embodiments. Blockchain functions may be referred to as blockchain operations.

As shown in FIG. 4, system 400 may include multiple user devices (e.g., user device 402, user device 404, and/or user device 406). For example, system 400 may comprise a distributed state machine, in which each of the components in FIG. 4 acts as a client of system 400. For example, system 400 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system. For example, system 400 may interact with, and facilitate the function of, blockchain 408.

It should be noted that, while shown as a smartphone, a personal computer, and a server in FIG. 4, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 400 performing a blockchain function may equally be applied to, and correspond to, an individual user device (e.g., user device 402, user device 408) performing the blockchain function. That is, system 400 may correspond to the user devices (e.g., user device 402, user device 404, and/or user device 406) collectively or individually.

Each of the user devices may be used by the system to conduct blockchain functions. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 4, one or more user devices may include a digital wallet (e.g., user device 404) used to perform blockchain functions. For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

As shown in FIG. 4, one or more user devices may include a private key and/or digital signature. For example, system 400 may use cryptographic systems for conducting sblockchain functions such as receiving and verifying cryptographic signatures. For example, system 400 may use public-key cryptography, which features a pair of digital keys (e.g., which may comprise strings of data). In such cases, each pair comprises a public key (e.g., which may be public) and a private key (e.g., which may be kept private). System 400 may generate the key pairs using cryptographic algorithms (e.g., featuring one-way functions). System 400 may then encrypt a message (or other blockchain function) using an intended receiver's public key such that the encrypted message may be decrypted only with the receiver's corresponding private key. In some embodiments, system 400 may combine a message with a private key to create a digital signature on the message. For example, the digital signature may be used to verify the authenticity of blockchain functions. As an illustration, when conducting blockchain functions, system 400 may use the digital signature to prove to every node in the system that it is authorized to conduct the blockchain functions.

For example, system 400 may comprise a plurality of nodes for the blockchain network. Each node may correspond to a user device (e.g., user device 404). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 404 may request a blockchain function (e.g., conduct a transaction). The blockchain function may be authenticated by user device 404 and/or another node (e.g., a user device in the community network of system 400). For example, using cryptographic keys, system 400 may identify users and give access to their respective user accounts (e.g., corresponding digital wallets) within system 400. Using private keys (e.g., known only to the respective users) and public keys (e.g., known to the community network), system 400 may create digital signatures to authenticate the users.

Following an authentication of the blockchain function, the blockchain function may be authorized. For example, after the blockchain function is authenticated between the users, system 400 may authorize the blockchain function prior to adding it to the blockchain. System 400 may add the blockchain function to blockchain 408. System 400 may perform this based on a consensus of the user devices within system 400. For example, system 400 may rely on a majority (or other metric) of the nodes in the community network (e.g., user device 402, user device 404, and/or user device 406) to determine that the blockchain function is valid. In response to validation of the block, a node user device (e.g., user device 402, user device 404, and/or user device 406) in the community network (e.g., a miner) may receive a reward (e.g., in a given cryptocurrency) as an incentive for validating the block.

To validate the blockchain function, system 400 may use one or more validation protocols and/or validation (or consensus) mechanisms. For example, system 400 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 400 may use a POS mechanism in which a user account (e.g., corresponding to a node on the blockchain network) is required to have, or "stake," a predetermined amount of tokens in order for system 400 to recognize it as a validator in the blockchain network.

In response to validation of the block, the block is added to blockchain 408, and the blockchain function is completed. For example, to add the blockchain function to blockchain 408, the successful node (e.g., the successful miner) encapsulates the blockchain function in a new block before transmitting the block throughout system 400.

Figure 5:
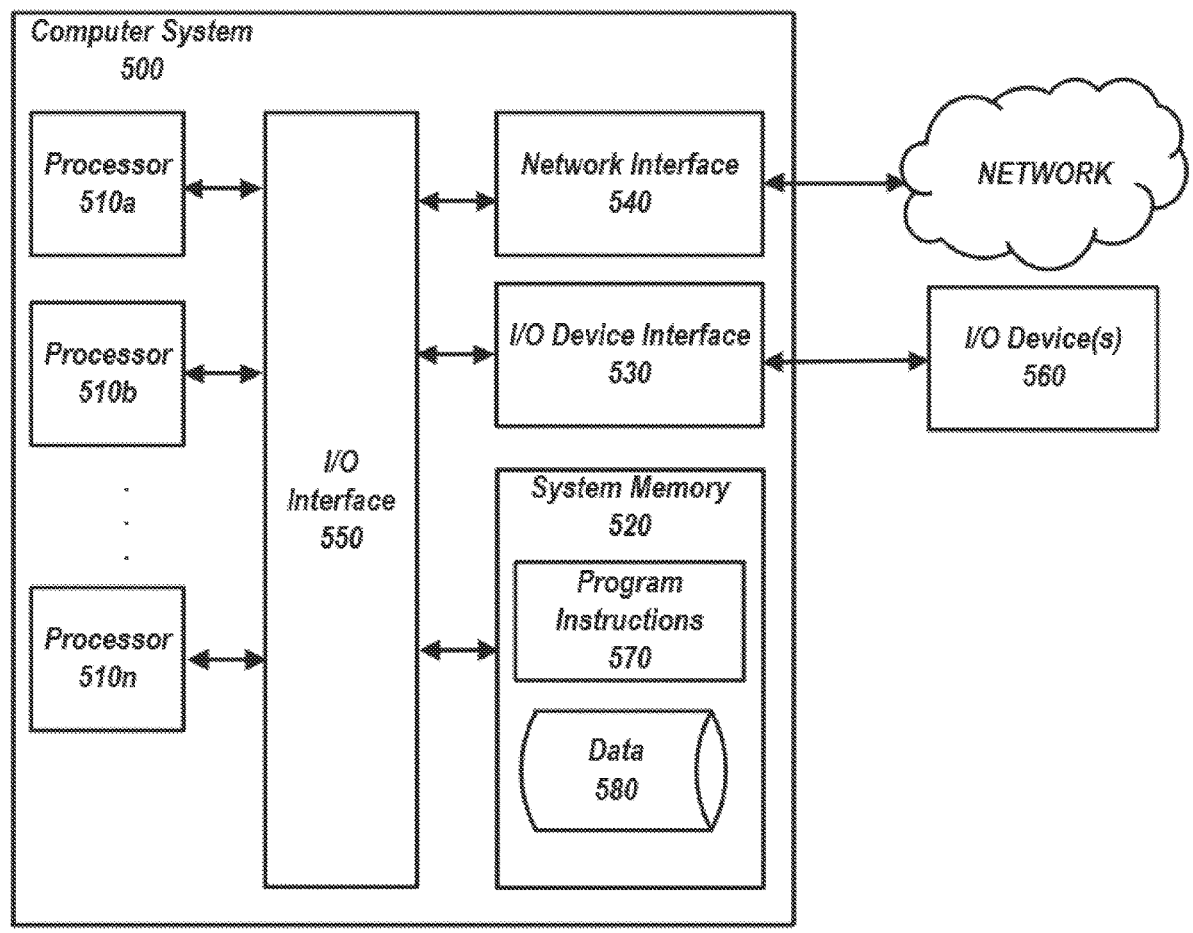
FIG. 5 shows illustrative components for a system used to communicate with one or more user devices and perform computations, in accordance with one or more embodiments.

FIG. 5 shows an example computing system that may be used in accordance with some embodiments of this disclosure. In some instances, computing system 500 is referred to as a computer system 500. A person skilled in the art would understand that those terms may be used interchangeably. The components of FIG. 5 may be used to perform some or all operations discussed in relation to FIGS. 1-3. Furthermore, various portions of the systems and methods described herein may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output (I/O) device interface 530, and a network interface 540 via an I/O interface 550. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). For example, I/O devices 560 may receive login requests from user devices or applications. I/O devices 560 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer systems, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may also communicate with the blockchain to perform blockchain operations. Network interface 540 may support wired or wireless communication. The network may include an electronic communication network, such as the Internet, a local area network (LAN), a wide area network (WAN), a cellular communications network, or the like.

System memory 520 may be configured to store program instructions 570 or data 580. Program instructions 570 may be executable by a processor (e.g., one or more of processors 510a-510n) to implement one or more embodiments of the present techniques. Program instructions 570 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices).

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500, or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 500 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 6:
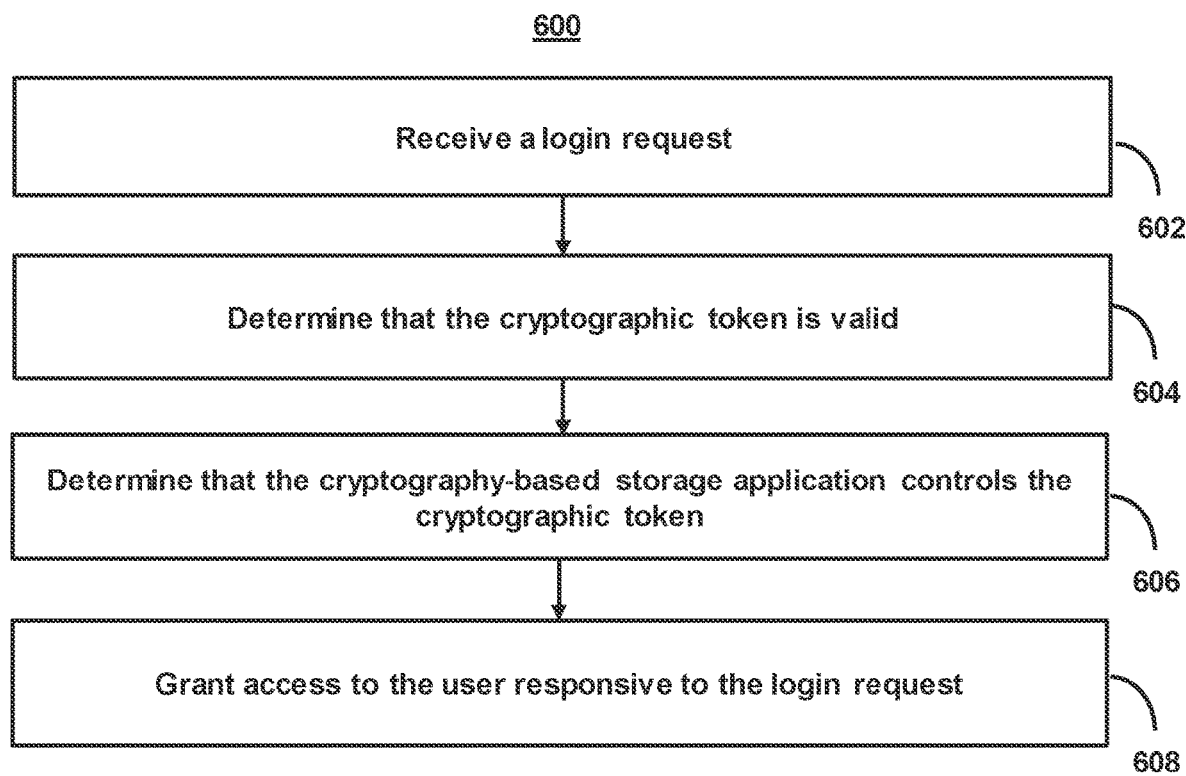
FIG. 6 shows a flowchart of operations involved in facilitating user device authentication using cryptographic tokens, in accordance with one or more embodiments.

FIG. 6 shows a flowchart of the steps involved in a system that authenticates user login requests using cryptographic tokens, in accordance with one or more embodiments. For example, the system may use process 600 (e.g., as implemented on one or more system components described above) in order to facilitate user device authentication using cryptographic tokens.

At 602, authentication system 102 (e.g., using one or more components described above) receives a login request from a user device. For example, authentication system 102 may be hosted on computer system 500. Thus, authentication system 102 may receive the login request via network interface 540 and may store the request in system memory 520. At 604, authentication system 102 (e.g., using one or more components described above) determines that the cryptographic token is valid using a token identifier. For example, authentication system 102 may use processor(s) 510a-510n to perform this operation. Furthermore, authentication system 102 may query blockchain 408 using a blockchain node and retrieve token data association with the cryptographic token.

At 606, authentication system 102 (e.g., using one or more components described above) determines that the cryptography-based storage application controls the cryptographic token. For example, authentication system 102 may use processor(s) 510a-510n to perform this operation. Furthermore, authentication system 102 may query blockchain 408 using a blockchain node and retrieve token data association with the cryptographic token. At 608, authentication system 102 (e.g., using one or more components described above) grants access to the user responsive to the login request if authentication is successful. For example, if the system determines that the cryptography-based storage application controls the cryptographic token and that the cryptographic token is valid, it may allow the user to log in to the second application.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different order, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving a login request, wherein the login request comprises (1) an address associated with a cryptography-based storage application of a user, (2) a cryptographic signature generated using a private key of the cryptography-based storage application, and (3) a token identifier of a cryptographic token; determining, using the token identifier, that the cryptographic token is valid; determining, using the cryptographic signature, that the cryptography-based storage application controls the cryptographic token; and based on determining that both the cryptography-based storage application controls the cryptographic token and that the cryptographic token is valid, granting access responsive to the login request.
2. The method of any one of the preceding embodiments, further comprising receiving, from a user device, an original login request, wherein the original login request comprises (1) the address associated with the cryptography-based storage application of the user and (2) authentication information for authenticating the user; authenticating the user using the authentication information; generating the cryptographic token, wherein the cryptographic token comprises a user identifier, a creator address associated with an application to which the original login request was directed; and transmitting, to a blockchain node of a blockchain, a blockchain operation request to commit the cryptographic token to the blockchain, wherein the blockchain operation request comprises the address associated with the cryptography-based storage application indicating that the cryptography-based storage application is to control the cryptographic token.
3. The method of any one of the preceding embodiments, wherein the login request is received from a first application on the user device and the original login request is received from a second application on the user device.
4. The method of any one of the preceding embodiments, further comprising retrieving an application identifier associated with the second application; determining, based on the application identifier, that the second application is an authorized authenticator; retrieving an application address corresponding to an original cryptography-based storage application associated with the second application; inserting the application address into the cryptographic token as the creator address; and signing the blockchain operation request with an original private key corresponding to the original cryptography-based storage application associated with the second application.
5. The method of any one of the preceding embodiments, further comprising retrieving, via the blockchain node of the blockchain, a uniform resource identifier associated with the cryptographic token; transmitting, to a computing device associated with the uniform resource identifier, a first insertion request to insert first metadata associated with the original login request into a login log associated with the cryptographic token, wherein the first insertion request is signed using a first private key corresponding to a first cryptography-based storage application of a first application to which the user logged in; and transmitting, to the computing device associated with the uniform resource identifier, a second insertion request to insert second metadata associated with the login request into the login log associated with the cryptographic token, wherein the second insertion request is signed using a second private key corresponding to a second cryptography-based storage application of a second application to which the user logged in.
6. The method of any one of the preceding embodiments, wherein determining that the cryptographic token is valid further comprises: retrieving, via a blockchain node of a blockchain, metadata associated with the cryptographic token; determining a generation address associated with the cryptographic token; comparing the generation address with a list of trusted generation addresses; and based on determining that the generation address matches another address on the list of trusted generation addresses, generating an indication that the cryptographic token is validated.
7. The method of any one of the preceding embodiments, wherein determining, using the token identifier, that the cryptographic token is valid further comprises: retrieving a uniform resource identifier associated with the cryptographic token; transmitting a request for the login log associated with the cryptographic token; and determining, based on the login log, that the cryptographic token has not been revoked.
8. The method of any one of the preceding embodiments, further comprising determining that a user device associated with the cryptography-based storage application has been compromised; based on determining that the user device has been compromised, retrieving a uniform resource identifier associated with the cryptographic token; and writing a revocation entry into the login log for the cryptographic token.
9. A tangible, non-transitory, machine-readable medium storing instructions that, when executed by a data processing apparatus, causes the data processing apparatus to perform operations comprising those of any of embodiments 1-8.
10. A system comprising one or more processors; and memory storing instructions that, when executed by the processors, cause the processors to effectuate operations comprising those of any of embodiments 1-8.
11. A system comprising means for performing any of embodiments 1-8.

What is claimed is:

1. A system for using cryptographic tokens to facilitate user device authentication from multiple applications, the system comprising:
one or more processors; and
one or more non-transitory, computer-readable media comprising instructions that when executed by the one or more processors cause operations comprising:
receiving, from a first application on a user device, a first login request, wherein the first login request comprises (1) a first address associated with a first cryptography-based storage application of a user and (2) a second address associated with a second cryptography-based storage application of the first application;
authenticating the user using authentication information within the first login request;
generating, using the first application, a cryptographic token for future authentication of the first application and other applications on the user device, wherein the cryptographic token comprises a user identifier;
transmitting, to a blockchain node of a blockchain, a blockchain operation request to commit the cryptographic token to the blockchain, wherein the blockchain operation request comprises (1) the first address indicating that the first cryptography-based storage application is to control the cryptographic token and (2) the second address indicating a creator of the cryptographic token;

receiving, from a second application on the user device, a second login request from the user device, wherein the second login request comprises (1) the first address associated with the first cryptography-based storage application, (2) a cryptographic signature generated using a private key of the first cryptography-based storage application, and (3) a token identifier of the cryptographic token;

determining, using the cryptographic signature, that the first cryptography-based storage application controls the cryptographic token; and in response to determining that the first cryptography-based storage application controls the cryptographic token, granting access to the user identifier based on the second login request.

2. The system of claim 1, wherein the instructions further cause the one or more processors to perform operations comprising:

retrieving an application identifier associated with the first application;

determining, based on the application identifier, that the first application is an authorized authenticator;

inserting the second address into the cryptographic token as a creator address; and signing the blockchain operation request with an application private key corresponding to the second cryptography-based storage application.

3. The system of claim 1, wherein the instructions further cause the one or more processors to perform operations comprising:

retrieving, via the blockchain node, metadata associated with the cryptographic token;

determining a generation address associated with the cryptographic token;

comparing the generation address with a list of trusted generation addresses; and based on determining that the generation address matches another address on the list of trusted generation addresses, generating an indication that the cryptographic token is validated.

4. The system of claim 1, wherein the instructions further cause the one or more processors to perform operations comprising:

retrieving, via the blockchain node, a uniform resource identifier associated with the cryptographic token;

transmitting, to a computing device associated with the uniform resource identifier, a first insertion request to insert first metadata associated with the first login request into a login log associated with the cryptographic token, wherein the first insertion request is signed using the private key corresponding to the first cryptography-based storage application of the first application; and transmitting, to the computing device associated with the uniform resource identifier, a second insertion request to insert second metadata associated with the second login request into the login log associated with the cryptographic token, wherein the second insertion request is signed using the private key corresponding to the first cryptography-based storage application.

5. A method for using cryptographic tokens to facilitate user device authentication, the method comprising:

receiving, from a user device, a first login request directed to a first application, the first login request comprising (1) a first address associated with a first cryptography-based storage application of a user and (2) authentication information of the user;

authenticating the user using the authentication information;

generating a cryptographic token comprising a user identifier indicating a second address associated with the first application;

transmitting, to a blockchain node of a blockchain, a blockchain operation request to commit the cryptographic token to the blockchain, wherein the blockchain operation request comprises the first address indicating that the first cryptography-based storage application is to control the cryptographic token;

receiving a second login request comprising (1) the first address, (2) a cryptographic signature generated using a private key of the first cryptography-based storage application, and (3) a token identifier of the cryptographic token;

determining, using the token identifier, that the cryptographic token is valid;

determining, using the cryptographic signature, that the first cryptography-based storage application controls the cryptographic token; and based on the first cryptography-based storage application controlling the cryptographic token and the cryptographic token being valid, granting access responsive to the second login request.

6. The method of claim 5, wherein the second login request is received from the first application on the user device and the first login request is received from a second application on the user device.

7. The method of claim 6, further comprising:

retrieving an application identifier associated with the second application;

determining, based on the application identifier, that the second application is an authorized authenticator;

retrieving a second address corresponding to a second cryptography-based storage application associated with the second application;

inserting the second address into the cryptographic token as a creator address; and signing the blockchain operation request with an original private key corresponding to the second cryptography-based storage application associated with the second application.

8. The method of claim 5, further comprising:

retrieving, via the blockchain node of the blockchain, a uniform resource identifier associated with the cryptographic token;

transmitting, to a computing device associated with the uniform resource identifier, a first insertion request to insert first metadata associated with the first login request into a login log associated with the cryptographic token, wherein the first insertion request is signed using a first private key corresponding to the first cryptography-based storage application of the first application to which the user logged in; and transmitting, to the computing device associated with the uniform resource identifier, a second insertion request to insert second metadata associated with the second login request into the login log associated with the cryptographic token, wherein the second insertion request is signed using a second private key corresponding to a second cryptography-based storage application of a second application to which the user logged in.

9. The method of claim 5, wherein determining that the cryptographic token is valid further comprises:
retrieving, via a blockchain node of a blockchain, metadata associated with the cryptographic token;
determining a generation address associated with the cryptographic token;
comparing the generation address with a list of trusted generation addresses; and
based on determining that the generation address matches another address on the list of trusted generation addresses, generating an indication that the cryptographic token is validated.

10. The method of claim 5, wherein determining, using the token identifier, that the cryptographic token is valid further comprises:
retrieving a uniform resource identifier associated with the cryptographic token;
transmitting a request for a login log associated with the cryptographic token; and
determining, based on the login log, that the cryptographic token is valid.

11. The method of claim 10, further comprising:
determining that a user device associated with the first cryptography-based storage application has been compromised;
based on determining that the user device has been compromised, retrieving a uniform resource identifier associated with the cryptographic token; and
writing a revocation entry into the login log for the cryptographic token.

12. One or more non-transitory computer-readable media storing instructions that, when executed by one or more processors, cause the one or more processors to perform operations comprising:
receiving, from a user device, a first login request directed to a first application, the first login request comprising (1) a first address associated with a first cryptography-based storage application of a user and (2) authentication information of the user;
authenticating the user using the authentication information;
generating a cryptographic token comprising a user identifier indicating a second address associated with the first application;
transmitting, to a blockchain node of a blockchain, a blockchain operation request to commit the cryptographic token to the blockchain, wherein the blockchain operation request comprises the first address indicating that the first cryptography-based storage application is to control the cryptographic token;
receiving a second login request comprising (1) the first address, (2) a cryptographic signature generated using a private key of the first cryptography-based storage application, and (3) a token identifier of the cryptographic token;
determining, using the token identifier, that the cryptographic token is valid;
determining, using the cryptographic signature, that the first cryptography-based storage application controls the cryptographic token; and
based on the first cryptography-based storage application controlling the cryptographic token and the cryptographic token being valid, granting access responsive to the second login request.

13. The one or more non-transitory computer-readable media of claim 12, wherein the second login request is received from the first application on the user device and the first login request is received from a second application on the user device.

14. The one or more non-transitory computer-readable media of claim 13, wherein the operations further comprise:
retrieving an application identifier associated with the second application;
determining, based on the application identifier, that the second application is an authorized authenticator;
retrieving a second address corresponding to a second cryptography-based storage application associated with the second application;
inserting the second address into the cryptographic token as a creator address; and
signing the blockchain operation request with an original private key corresponding to the second cryptography-based storage application associated with the second application.

15. The one or more non-transitory computer-readable media of claim 12, wherein the operations further comprise:
retrieving, via the blockchain node of the blockchain, a uniform resource identifier associated with the cryptographic token;
transmitting, to a computing device associated with the uniform resource identifier, a first insertion request to insert first metadata associated with the first login request into a login log associated with the cryptographic token, wherein the first insertion request is signed using a first private key corresponding to the first cryptography-based storage application of the first application to which the user logged in; and
transmitting, to the computing device associated with the uniform resource identifier, a second insertion request to insert second metadata associated with the second login request into the login log associated with the cryptographic token, wherein the second insertion request is signed using a second private key corresponding to a second cryptography-based storage application of a second application to which the user logged in.

16. The one or more non-transitory computer-readable media of claim 12, wherein determining that the cryptographic token is valid comprises:
retrieving, via a blockchain node of a blockchain, metadata associated with the cryptographic token;
determining a generation address associated with the cryptographic token;
comparing the generation address with a list of trusted generation addresses; and
based on determining that the generation address matches another address on the list of trusted generation addresses, generating an indication that the cryptographic token is validated.

17. The one or more non-transitory computer-readable media of claim 12, wherein determining, using the token identifier, that the cryptographic token is valid further comprises:
retrieving a uniform resource identifier associated with the cryptographic token;
transmitting a request for a login log associated with the cryptographic token; and
determining, based on the login log, that the cryptographic token is valid.

18. The one or more non-transitory computer-readable media of claim 17, wherein the operations further comprise:
- determining that a user device associated with the first cryptography-based storage application has been compromised;
- based on determining that the user device has been compromised, retrieving a uniform resource identifier associated with the cryptographic token; and
- writing a revocation entry into the login log for the cryptographic token.

* * * * *